US012091883B2

(12) United States Patent
Morgan

(10) Patent No.: US 12,091,883 B2
(45) Date of Patent: Sep. 17, 2024

(54) OVERHEAD DOOR INTERLOCK DEVICE

(71) Applicant: James Morgan, Parkville, MO (US)

(72) Inventor: James Morgan, Parkville, MO (US)

( * ) Notice: Subject to any disclaimer, the term of this patent is extended or adjusted under 35 U.S.C. 154(b) by 287 days.

(21) Appl. No.: 16/864,579

(22) Filed: May 1, 2020

(65) Prior Publication Data

US 2021/0340791 A1 Nov. 4, 2021

(51) Int. Cl.
*E05B 17/22* (2006.01)
*E05B 63/18* (2006.01)
*E05B 65/00* (2006.01)

(52) U.S. Cl.
CPC .............. *E05B 17/22* (2013.01); *E05B 63/18* (2013.01); *E05B 65/0021* (2013.01); *E05Y 2900/132* (2013.01)

(58) Field of Classification Search
CPC .. E05B 2047/0069; E05B 17/22; E05B 63/18; E05B 65/0021; E05B 47/0603; E05B 65/0847; E05B 65/0852; Y10T 292/1025; Y10T 292/1086; Y10T 292/1051; Y10T 292/1052; Y10T 70/8027; E06B 2003/7046; Y10S 292/36; E05Y 2900/132
See application file for complete search history.

(56) References Cited

U.S. PATENT DOCUMENTS 2,278,706 A 4/1942 Laufersweiler et al.
3,781,322 A 12/1973 Acton et al.
3,988,031 A * 10/1976 Meyer ................... E05B 67/383 292/205
RE29,162 E * 3/1977 McLennan .............. E05C 3/048 292/DIG. 19
4,031,719 A * 6/1977 Klingler .................. E05B 67/38 70/56
4,068,505 A * 1/1978 Volk, Jr. .................. E05B 67/38 70/56
4,581,907 A * 4/1986 Eberly .................... E05B 67/38 292/281

(Continued)

FOREIGN PATENT DOCUMENTS

GB 2247719 B 7/1992
WO 2016176033 A1 11/2016

OTHER PUBLICATIONS

The Genie ® Company, page from website: commercial.geniecompany.com/accessories/door-interlock-switches.aspx; Nov. 25, 2019.

(Continued)

*Primary Examiner* — Christine M Mills
*Assistant Examiner* — Faria F Ahmad
(74) *Attorney, Agent, or Firm* — AVEK IP, LLC; Mark C. Young

(57) ABSTRACT

An overhead door interlock device provides an electrical signal indication of the locked or unlocked status of an overhead door, and interfaces with control circuitry of the door's opener to allow or disallow operation of the door based on the locked or unlocked status. In one embodiment, a lever is pivotably attached to the doors track, with the lever engaging with a switch mechanism to indicate the locked or unlocked status of the door. A spring mechanism automatically returns the lever to an unlocked position when the door's lock bar is retracted, with the lever mechanically inhibiting locking of the door until the lever is moved by a user.

11 Claims, 4 Drawing Sheets

(56) References Cited

U.S. PATENT DOCUMENTS 4,643,469 A * 2/1987 Johnston .................. E05C 5/00 292/148
4,658,106 A 4/1987 Makoe
4,697,442 A * 10/1987 Stendal ............... E05B 65/0021 292/201
4,771,218 A * 9/1988 McGee .................. E05B 47/02 318/16
4,819,379 A * 4/1989 Kenzelmann ....... E05B 47/0002 49/280
4,895,007 A * 1/1990 Eberly .................... E05B 67/38 292/205
5,511,835 A * 4/1996 Hardee ............... E05B 17/2023 292/205
5,533,561 A 7/1996 Forehand, IV
5,720,333 A * 2/1998 Turvey ...................... E06B 9/86 160/310
5,755,060 A 5/1998 Zweili
5,799,990 A * 9/1998 Hardee ................... E05C 3/145 292/284
6,027,148 A * 2/2000 Shoemaker ......... E05B 65/0021 292/201
6,048,000 A 4/2000 Geringer et al.
6,089,626 A * 7/2000 Shoemaker ......... E05B 65/0021 292/201
6,672,009 B1 * 1/2004 Wong ...................... E05D 15/22 49/181
6,834,464 B2 * 12/2004 Shoemaker ......... E05B 65/0021 292/DIG. 36
7,114,753 B2 10/2006 Nodorft
7,240,524 B1 7/2007 White et al.
7,484,332 B2 * 2/2009 Hormann .............. E05D 13/006 49/200
8,827,332 B2 * 9/2014 Balay .................. E05B 47/0603 292/341.15
9,187,931 B2 * 11/2015 Hudson ............... E05B 65/0021
9,284,764 B2 3/2016 Hudson et al.
9,388,634 B2 * 7/2016 Hardison, III ............ E06B 9/86
9,777,512 B2 10/2017 Curtis et al.
10,246,904 B1 * 4/2019 White ................ E05B 47/0001
10,704,305 B2 * 7/2020 Miyachi .............. E05B 47/0004
2003/0188489 A1 * 10/2003 Shoemaker ......... E05B 65/0021 49/449
2004/0069419 A1 * 4/2004 Becker ................ E05B 65/0021 160/188
2004/0212197 A1 10/2004 Shoemaker
2011/0252844 A1 10/2011 Shoemaker
2013/0088025 A1 * 4/2013 Balay .................. E05B 47/0603 292/341.17
2014/0319851 A1 * 10/2014 Curtis ................. E05B 15/0295 292/215
2015/0061300 A1 * 3/2015 Hudson ............... E05B 65/0021 292/164
2017/0067271 A1 * 3/2017 Schroeder ................. E05C 3/24
2021/0180402 A1 * 6/2021 Janick ................. E05B 65/0021

OTHER PUBLICATIONS

North Shore Commercial Door, page from website: https://www.northshorecommercialdoor.com/cogadoopisin.html; Nov. 25, 2019.

* cited by examiner

OVERHEAD DOOR INTERLOCK DEVICE

BACKGROUND OF THE INVENTION

Field of the Invention

The claimed invention relates generally to overhead door systems, and more specifically to an interlock device for overhead doors.

Description of the Related Art

Overhead doors are ubiquitous in homes, warehouses, and factories, providing quick and easy access to areas when opened, and securing those same areas when closed and locked. An overhead door system typically includes a sectional door that travels along two roller tracks positioned on opposite sides of the door opening. The separate sections of the door are hingedly attached together, with rollers attached at opposite ends of each section to engage with and travel in the corresponding roller track. The door can thus be moved between a downward or closed position—with the door covering the opening, and an upward or open position—with the door moved overhead to leave the opening uncovered.

In many installations, an electric door opener is used in conjunction with the overhead door to allow automated opening and closing of the door, usually by pressing a button or flipping a switch associated with the door to actuate the door opener. Once actuated, a motor on the door opener drives a chain, screw, cable, or belt drive mechanism that is attached to the door, and moves the door to the open, closed, or other desired position. In commercial and industrial applications, such as warehouses, loading docks, and the like, multiple doors are typically present with each attached to a door opener and each potentially capable of operation on command by operation of remotely positioned switch.

While convenient when operation is desired, doors are often mechanically secured to prevent operation for security reasons, as well as for safety reasons, such as to mechanically prevent operation of the door during maintenance operations. When mechanically locked, however, inadvertent attempted operation of the door, e.g., pushing the door opener switch, can cause damage to the drive motor, door tracks, or other components of the door. In an attempt to mitigate any such damage, specialized break-away slide locks are often used to mechanically lock the doors, with the sliding bar of the slide lock shearing if subjected to the full force of the door opener. Even though break-away sliding bolt locks alleviate extensive damage due to inadvertent operation when the door is locked, there is sometimes minor damage incurred, and the locks must be replaced once broken, incurring additional expense.

Thus, it can be seen that there remains a need in the art for a device that overcomes the shortcomings of devices known in the art, and to prevent damage to an overhead door if inadvertent operation is commanded.

SUMMARY OF THE INVENTION

The present invention is directed to an overhead door interlock device that provides an electrical signal to a door opener indicative of the locked or unlocked mechanical state of the door.

In one embodiment, the interlock device comprises an elongated lever extending between a lower end and an upper end, and a switch for detecting the position of the lever. The lever portion comprises an aperture formed near the lower end to allow the lever to be pivotably attached to a track of an overhead door, with a tab extending from the upper end of the lever to engage with the switch. The switch is mounted to the track near the upper end of the lever in proximity to the tab protruding from the upper end of the lever such that the tab is positioned to engage the switch when the lever is pivoted to a nearly vertical or unlocked position and to not engage the switch when the lever is pivoted away from vertical to a locked position. The switch is wired in electrical communication with control circuitry of the door opener such that the control circuitry allows operation of the door opener when the lever is in the unlocked position and prevents operation of the door opener when the lever is in the locked position.

In a further embodiment, the interlock device includes a spring mechanism configured to bias the lever to its unlocked position. The spring mechanism includes a mounting bracket which is attached to the door track, or to a surface adjacent the door track, with a pin extending outwardly from the mounting bracket towards the lever and through an aperture in a surface of the lever. A coil spring positioned over the pin is compressed when the lever is in its locked position, with the spring returning the lever to its unlocked position once the mechanical lock is disengaged from the lever.

Other exemplary embodiments are also described herein.

DETAILED DESCRIPTION OF EXEMPLARY EMBODIMENTS

Figure 1:
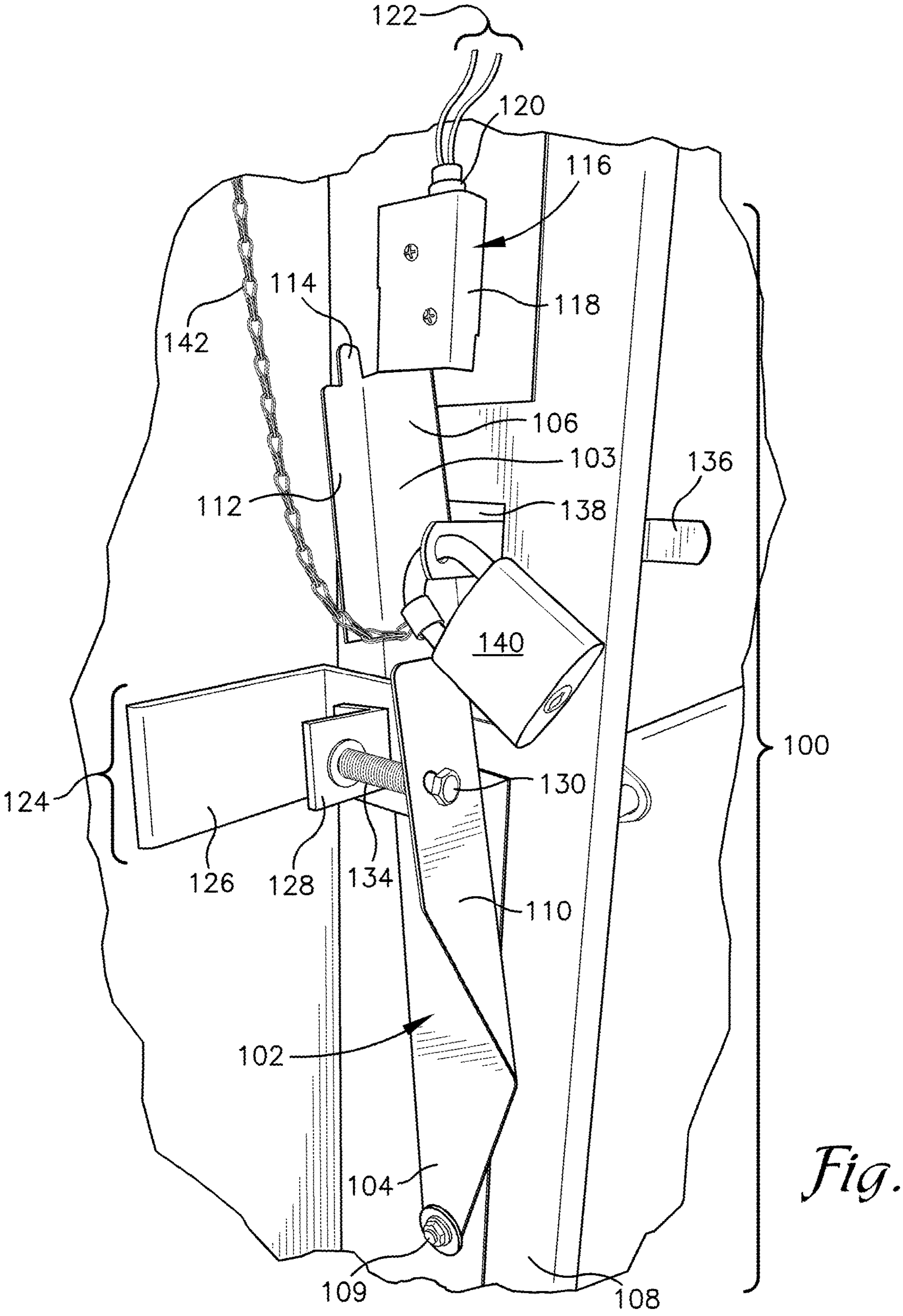
FIG. 1 is a perspective view of an overhead door interlock device attached to a door track, with the door's locking mechanism in a locked position in accordance with an exemplary embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, words such "upwardly," "downwardly," "rightwardly,", "leftwardly", "horizontally", and "vertically" used herein refer to directions in the drawings to which reference is made. The words "inwardly" and "outwardly" refer to directions toward and away from, respectively, the geometric center of the embodiment being described and designated parts thereof. That terminology will include the words specifically mentioned, derivatives thereof and words of a similar import.

Looking to FIG. 1, an overhead door interlock device in accordance with an exemplary embodiment of the present invention is depicted generally by the numeral 100. The interlock device 100 comprises an elongated lever 102 having a main body 103 that extends between a first end 104 and a second end 106. An aperture formed through the lever 102 near the first end 104 allows the lever 102 to pivotably attach to the track 108 of an overhead door via a bolt 109. A lower folded portion 110 extends orthogonally from a front edge of the main body 103, and an upper folded portion 112 extends orthogonally from a rear edge of the main body 103. A tab 114 extends upwardly from the upper folded portion 112, protruding from the second end 106 of the lever 102, the tab 114 configured to engage with a switch to detect the position of the lever 102 as will be described in more detail below.

A switch mechanism 116 is mounted to the door track 108, adjacent the upper end 106 of the lever 102. The switch mechanism 116 comprises a housing 118, with a switch 120 (best seen in FIGS. 3 through 5) attached to the housing 118, and with the electrical leads 122 of the switch extending upwardly from the housing 118 for electrical connection to the control circuitry of a door opener. Looking to FIG. 3, switch 120 comprises an actuation arm 121 with a roller 123 for engaging with the tab 114 of the lever 102. Preferably, switch 120 is a normally open or normally closed switch as is known in the art. The electrical leads 122 of the switch 120 preferably attach to the control circuitry, or sally port, of a door opener used to operate the door with which the interlock mechanism is used. As will be described in more detail below, the switch 120 indicates the locked or unlocked status of the interlock device, and provides an indication of that status to the control circuitry of the door opener which allows or prohibits operation of the opener based on that status.

Figure 3:
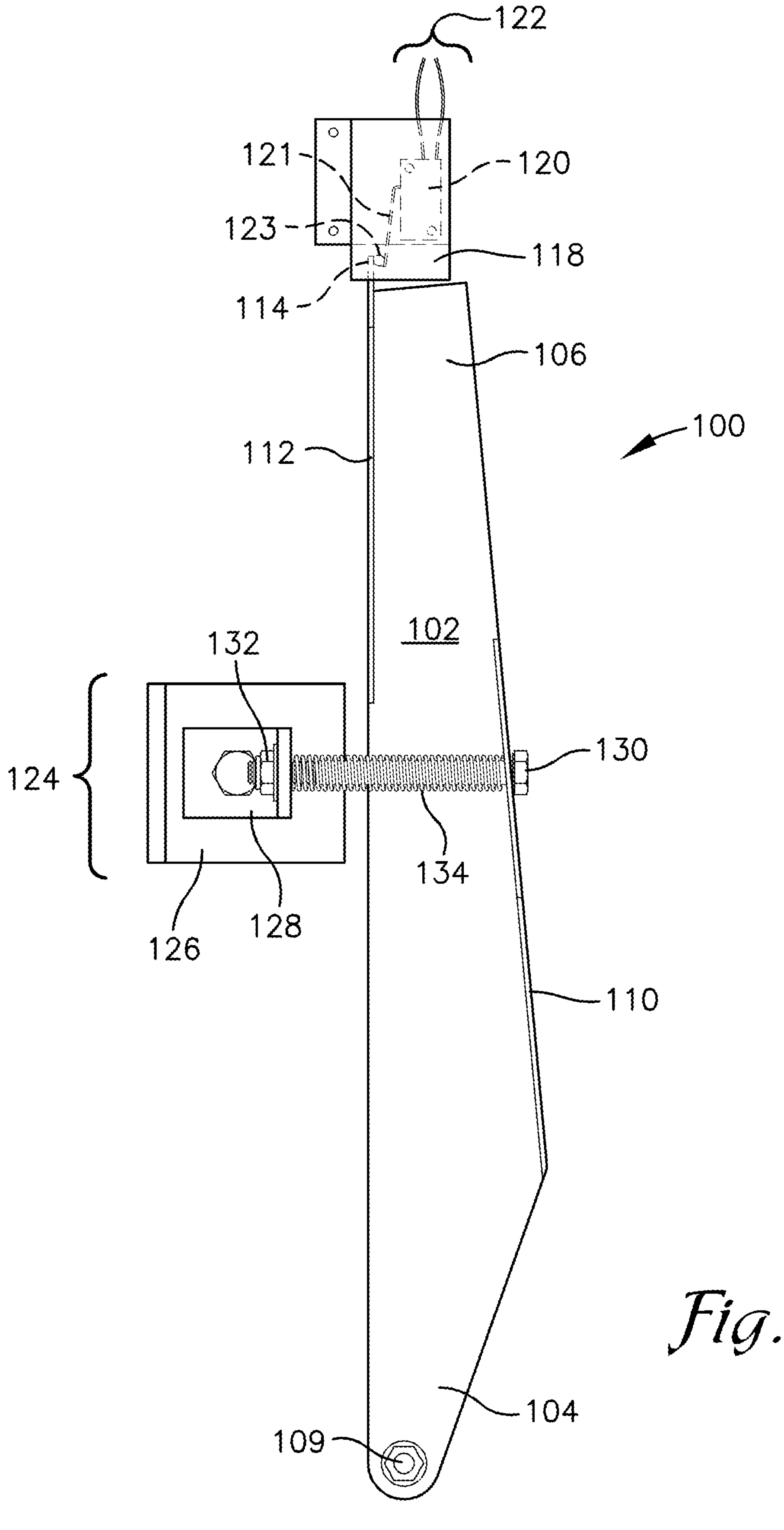
FIG. 3 is a side view of the door interlock device of FIG. 1.

A spring mechanism 124 is attached to the door track 108, approximately midway between the upper and lower ends 104, 106 of the lever 102, in proximity to the rear edge of the lever 102. The spring mechanism 124 comprises a main right-angle support 126, with a smaller right-angle bracket 128 mounted to the main right-angle support 126, with a pin 130 extending from the smaller right-angle bracket 128 and through an aperture in the lower folded portion 110 of the lever 102. In the exemplary embodiment depicted, the pin 130 is a bolt extending through the aperture in the lower folded portion 110 and through a corresponding aperture in the smaller right-angle bracket 128, with a nut 132 (as seen in FIG. 3) attaching the bolt between the lower folded portion 110 and the smaller right-angle bracket 128. The pin 130 extends through a compression spring 134 such that the spring 134 is positioned between the smaller right-angle bracket 128 and the lower folded portion 110 of the lever 102. As is known in the art, washers may be used with the pin 130, nut 132, spring 134, and other attachments and fasteners to provide proper fitment and securement.

As depicted in FIG. 1, the overhead door interlock 100 is attached to a door track 108 of an overhead door. That overhead door and door track 108 further include a locking bar 136 that may be manually extended (as seen in FIG. 1) through an opening 138 in the door track 108 to allow the shackle of a padlock 140 to be inserted into an aperture in the end of the locking bar 136. In that locked position, the locking bar 136 mechanically prevents the overhead door from moving as the locking bar 136 prevents the door roller(s) from traversing the track. A chain 142 secures the padlock 140 in proximity to the locking bar 136 when the padlock is not in use.

With the configuration of the exemplary embodiment of the overhead door interlock device set forth as just described, the use and operation of the device will now be described with reference to FIGS. 1 through 5.

Looking to FIG. 1, as described above, the overhead door interlock device 100 of the present invention is attached to a door track 108 of an overhead door that is controlled by a door opener having a drive motor (or other motive means) controlled by control circuitry having an interface or sally port option for the connection of external sensors. In operation, the electrical leads 122 of the switch 120 of the interlock device 100 are connected to the control circuitry, interface, or sally port terminal of the door opener.

Looking to FIG. 1, the overhead door is mechanically locked by pivoting lever 102 to its non-vertical, locked position. With the lever 102 in that position, opening 138 in the door track 108 is exposed such that the lock bar 136 can be slid through the opening 138 and a padlock 140 placed through the aperture in the end of the lock bar 136. With the lever 102 in that position, compression spring 134 is compressed on pin 130 between the small right-angle bracket 128 and the lower folded portion 110 of the lever. Furthermore, with the lever 102 in that locked position, the tab 114 extending from the upper end 106 of the lever 102 does not contact the switch 120 of the switch mechanism.

Thus, with the overhead door physically locked via locking bar 136 and padlock 140, movement of the door is mechanically prohibited. And, with the overhead door physically locked, the lever 102 is pivoted to its non-vertical, locked, position, with spring 134 compressed and, as best seen in FIG. 4, with the tab 114 not engaging the switch 120.

Figure 2:
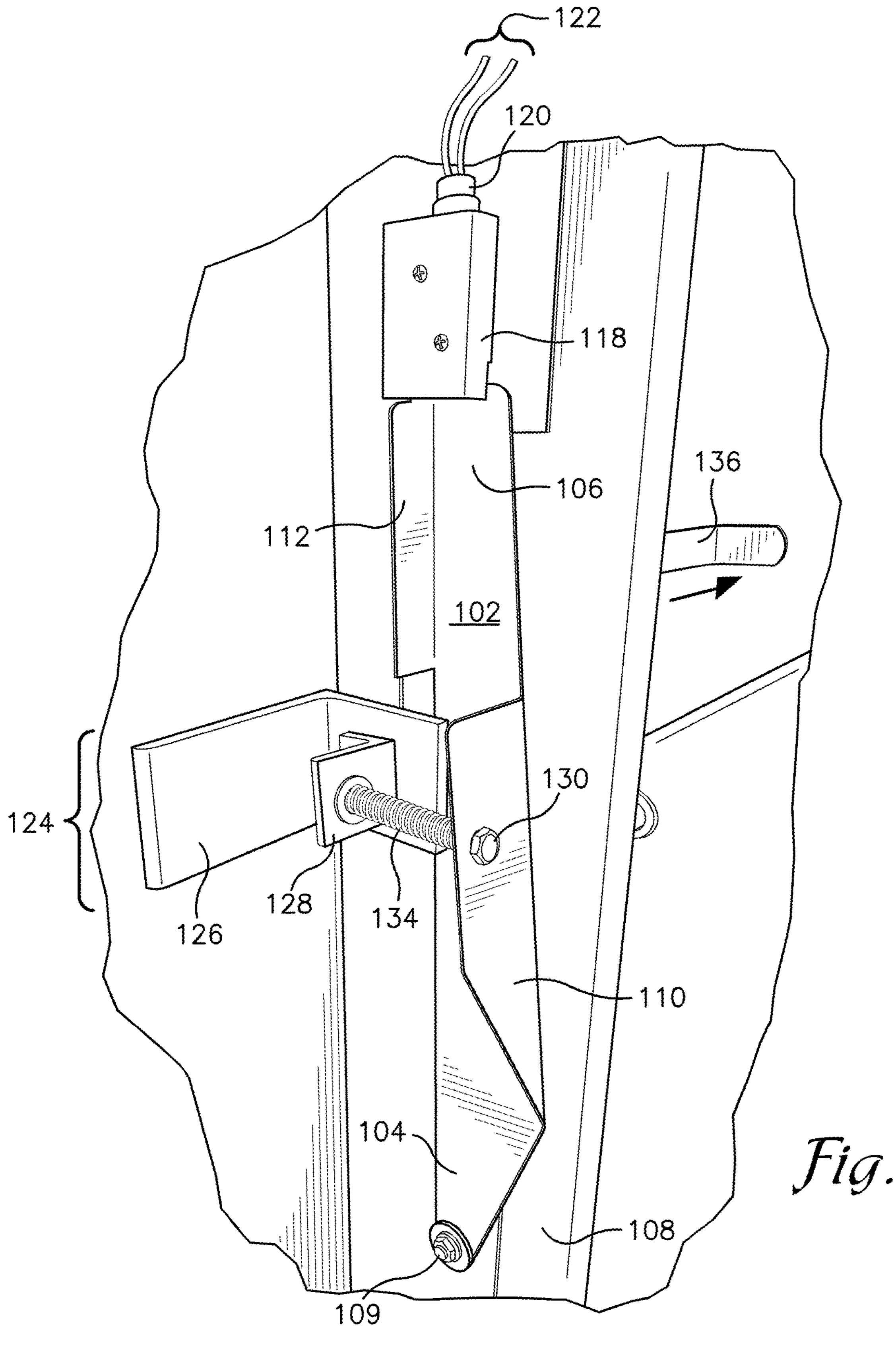
FIG. 2 is a perspective view of the interlock device of FIG. 1 with the door's locking mechanism in the unlocked position.

Turning to FIG. 2, with the overhead door unlocked, the locking bar 136 is pulled away from the door track 108 so that no padlock can be attached, and the lever 102 is moved to its vertical, or unlocked, position. In this unlocked position, as best seen in FIG. 5, the tab 114 engages with the roller 123 to actuate the switch.

Looking to FIGS. 1 and 2, it should be understood that when the lever is in its unlocked position (as in FIG. 1), the spring 134 is compressed. When the padlock 140 is removed and the lock bar 136 is retracted from the door track 108, the force of the compressed spring 134 will move the lever 102 to its vertical or unlocked position. Thus, upon retraction of the lock bar 136 the lever 102 will automatically move to the unlocked position as the compression in the spring is relieved.

Figure 4:
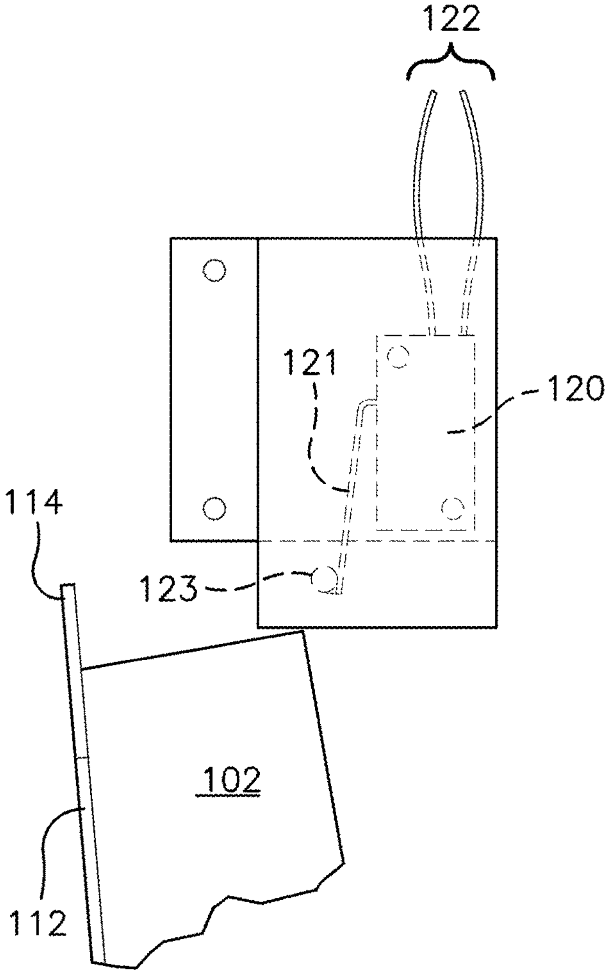
FIG. 4 is partial, close-up view of a top portion of the door interlock device of FIG. 3, with the lever in the locked position.
Figure 5:
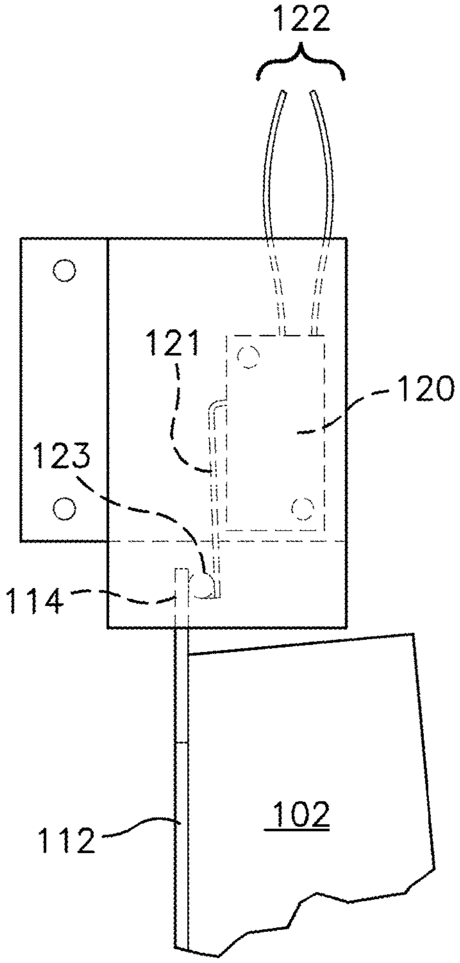
FIG. 5 is a partial, close-up view of a top portion of the door interlock device of FIG. 3, with the lever in the unlocked position.

Looking to FIGS. 4 and 5, it can be seen that the switch 120 is not actuated when the door is in the locked position (FIG. 4) and the tab 114 of lever 102 does not engage the switch roller 123, and that the switch is actuated when the door is in unlocked position (FIG. 5) and the tab 114 of lever 102 engaged the switch roller. Thus, the switch 120 provides an indication via electrical leads 122 to the control circuitry or sally port of a door opener of the locked or unlocked status of the door. It should be understood that switch 120 may be either a normally open or a normally closed switch, and that the control circuitry or sally port of the door opener being capable of decoding either an open or closed circuit to indicate the locked or unlocked status of the door. In other embodiments, the switch 120 may be a normally open or normally closed switch as required by the control circuitry.

It should be further understood that in addition to providing an electrical indication of the locked or unlocked status of the door that the interlock device of the present invention further provides a mechanical inhibition to locking the door. As described above and with reference to FIG. 2, with the lock bar 136 retracted, the spring 134 returns the lever 102 to its upright, unlocked, position. In that position the opening 138 in the door track 108 is covered by the lever 102. In order to lock the door again a user must physically move or push the lever 102 to its locked position (as seen in FIG. 1) so that the lock bar 136 may again be extended through the opening 138 in the door track. Thus, in addition to providing an electrical indication of the locked or unlocked status of the door, the interlock device of the present invention also provides a mechanical barrier to locking the door without moving the lever 102 to the proper position. This ensures that the status signal provided by switch 120 correlates with the mechanical position of the lever 102 and of the locking bar 136.

It should be understood that other configurations and variations of the exemplary embodiment described herein are within the scope of the present invention. For example, while the switch is depicted as having an actuation arm and roller, one skilled in the art will recognize that other types of switches may be employed. For example, the switch may be a push button switch, or may be a proximity switch such as a magnetic or capacitive type switch. Or, while the spring in the exemplary embodiment is a compression spring, a tension spring attached between the lever and the door track may likewise be used. These and other variations are contemplated by the present invention.

It is to be understood that while certain forms of the present invention have been illustrated and described herein, it is not to be limited to the specific forms or arrangement of parts described and shown, and that various features and combinations of features may be used in other embodiments without deviating from the scope of the present invention.

Having thus described the invention, what is claimed and desired to be secured by this patent is as follows:

1. A device for attachment to a track of an overhead door, the device operable to provide an electrical signal indicative of a locked or unlocked state of the door and to prohibit operation of an electric door opener attached to the door when in the locked state, comprising:

a lever extending between first and second ends, wherein the first end of the lever comprises an aperture formed therethrough to allow attachment to a track of an overhead door using a bolt extending through the aperture and a corresponding aperture in the track, such that the lever is pivotably movable about the bolt, and wherein the second end of the lever is configured to actuate a switch; and a switch mechanism comprising a housing and a switch, wherein the switch mechanism is configured to attach to the track of the overhead door in proximity to the second end of the lever such that the switch is positioned to be actuated by the second end of the lever, wherein the lever is configured to attach to the track adjacent an opening in the track, the opening configured to receive an end of a slidable mechanical locking bar of the door such that the mechanical locking bar may be moved into the opening to lock and prevent movement of the door, and wherein the lever is operable to pivot between a first, non-vertical locked position in which the lever does not cover the opening when the mechanical locking bar is slidably moved into the opening to lock the door, and a second, vertical non-locked position in which the lever covers the opening when the mechanical locking bar is slidably moved out of the opening and wherein the lever actuates the switch whereby the switch provides an electrical signal indicative of the locked or unlocked state of the door to a control circuitry of an electrical door opener to prevent operation of the overhead door when the door is in a locked state.

2. The interlock device of claim 1, wherein the second end of the lever comprises a tab extending outwardly therefrom.

3. The interlock device of claim 1, wherein the switch is attached to the housing and wherein electrical leads of the switch extend upwardly from the housing to allow electrical connection to the control circuitry.

4. The interlock device of claim 3, wherein the switch comprises a normally open switch or a normally closed switch.

5. The interlock device of claim 3, wherein the switch comprises a mechanical switch or a proximity switch.

6. The interlock device of claim 1, further comprising a spring mechanism that provides a spring bias to the lever such that the spring mechanism returns the lever to the second, vertical non-locked position when the door is in an unlocked state.

7. A method of detecting a locked or unlocked state of an overhead door to prevent operation of a door opener when in a locked state, comprising:

attaching a device to a track of an overhead door, the device operable to provide an electrical signal indicative of a locked or unlocked state of the door, the device comprising:

a lever extending between first and second ends, wherein the first end of the lever comprises an aperture formed therethrough to allow attachment to a track of an overhead door using a bolt extending through the aperture and a corresponding aperture in the track, such that the lever is pivotably movable about the bolt, and wherein the second end of the lever is configured to actuate a switch; and a switch mechanism comprising a housing and a switch, wherein the switch mechanism is configured to attach to the track of the overhead door in proximity to the second end of the lever such that the switch is positioned to be actuated by the second end of the lever, wherein the lever is configured to attach to the track adjacent an opening in the track, the opening configured to receive an end of a slidable mechanical locking bar of the door such that the mechanical locking bar may be moved into the opening to lock and prevent movement of the door, and wherein the lever is operable to pivot between a first, non-vertical locked position in which the lever does not cover the opening when the mechanical locking bar is slidably moved into the opening to lock the door, and a second, vertical non-locked position in which the lever covers the opening when the mechanical locking bar is slidably moved out of the opening and wherein the lever actuates the switch whereby the switch provides an electrical signal indicative of the locked or unlocked state of the door; and providing the electrical signal indicative of the locked or unlocked state of the door to an electrical door opener to prevent operation of the overhead door when the door is in a locked state.

8. The method of claim 7, wherein the second end of the lever comprises a tab extending outwardly therefrom, the tab configured to contact and actuate the switch.

9. The method of claim 7, wherein the switch is attached to the housing and wherein electrical leads of the switch extend upwardly from the housing to allow electrical connection to the control circuitry.

10. The method of claim 7, wherein the switch comprises a normally open switch or a normally closed switch.

11. The method of claim 7, wherein the switch comprises a mechanical switch or a proximity switch.

* * * * *